No. 767,830. PATENTED AUG. 16, 1904.
W. S. PAIN.
MUSIC ROLL FOR PIANOLAS, &c.
APPLICATION FILED JULY 16, 1903.
NO MODEL.
Fig. 1,
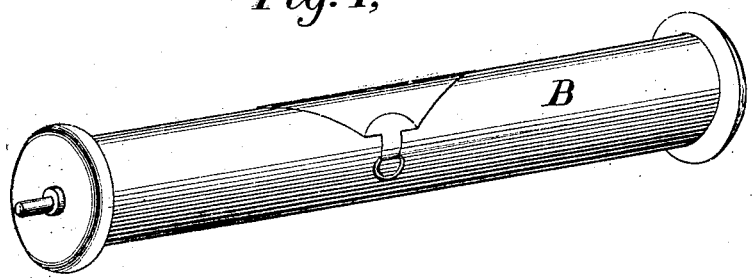
Fig. 2,
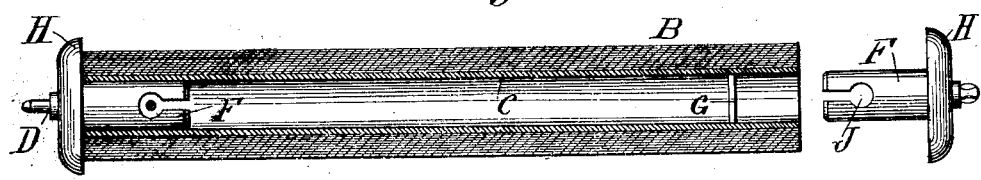
Fig. 3, Fig. 4,
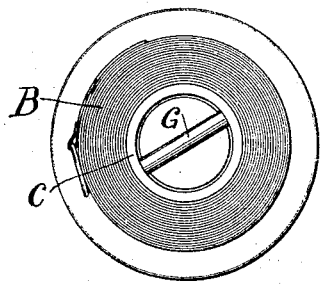 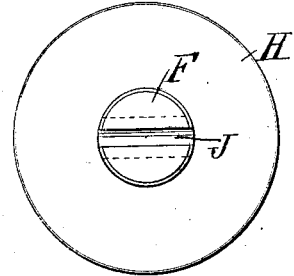
WITNESSES: INVENTOR
Willard S. Pain
By Dickerson, Brown, Raegener & Binney
his ATTORNEYS No. 767,830.

Patented August 16, 1904.

UNITED STATES PATENT OFFICE.

WILLARD S. PAIN, OF MERIDEN, CONNECTICUT, ASSIGNOR TO THE AEOLIAN COMPANY, OF NEW YORK, N. Y., A CORPORATION OF CONNECTICUT.

MUSIC-ROLL FOR PIANOLAS, &c.

SPECIFICATION forming part of Letters Patent No. 767,830, dated August 16, 1904.

Application filed July 16, 1903. Serial No. 165,772. (No model.)

*To all whom it may concern:*

Be it known that I, WILLARD S. PAIN, a citizen of the United States, residing at Meriden, in the State of Connecticut, (post-office address, care of Aeolian Company, Meriden, Connecticut,) have invented certain new and useful Improvements in Music-Rolls for Pianolas and Similarly-Controlled Instruments, of which the following is a specification accompanied by drawings.

The invention is of so simple a nature that the objects and many advantages will be readily understood from its immediate description. Particularly it will be noticed that it effects great economy in the boxing and shipment of music-rolls, because they may be shipped without end flanges, thereby saving length, diameter, and weight of package. Furthermore, a single pair of heads or flanges would suffice for any number of similar rolls and can be used interchangeably with any of them.

In the drawings, Figure 1 shows a complete roll provided with detachable heads or flanges embodying the present invention. Fig. 2 is a central longitudinal section through the roll, showing the heads or flanges in full, one of them being in place in the roll and the other withdrawn from the roll. Fig. 3 is an end view of the roll without one of the heads or flanges. Fig. 4 is an inner end view of one of the heads.

The roll itself consists, as usual, of the wound-up sheet of perforated sheet-music B, supported upon a core C, which may be, as is common, a tube made of the same material or even the same piece as the music-sheet, though in the contemplation of this invention the core may be of any suitable material and construction adapted to receive and hold the end flanges or heads. The detachable heads are shown at H and are provided with the means for centering and rotatably supporting the roll. The form of these supports D E is here illustrated as being such as is common on Æolian rolls, the support D being the journal and the support E being the exterior clutch member or connection by which the roll can be rotated. Each of the flanged heads H has an inward-projecting cylindrical portion or shank F, preferably slightly tapered and adapted to fit and be retained by friction within the hollow end of the core C. The invention also provides means for preventing the possible turning of the head by the exterior clutch E without its causing the roll to turn. This is illustrated in the form of a clutch consisting of a clutch member (shown as a pin G) extending across the tubular core or body portion and a coöperating clutch member (shown as a recess or slot J) in the cylindrical portion F of the head. Preferably the recess J is enlarged at its inner end, as shown, so that after it is thrust in to embrace the pin G the head can be slightly turned and thereby locked upon the pin G, so that it cannot be displaced without again turning it slightly.

In the broader aspects of the invention the form of this invention, like the form of the connection for rotating the head, is not material.

What I claim, therefore, and desire to secure by these Letters Patent, are the following features:

1. The combination with a music-roll having a hollow center, of detachable end flanges having securing members adapted to fit and be frictionally held within the ends of the roll, and an axially-located driving clutch member carried on the outer face of one of said flanges for substantially the purposes set forth.

2. The combination with a music-roll having a hollow center, of detachable end flanges having securing members adapted to fit and be frictionally held within the ends of the roll, and one of them provided with positive means for rotating the roll with the flange, and with a member of a detachable driving connection for driving such flange for substantially the purposes set forth.

3. The combination of a music-roll provided with a clutch member and a detachable head provided with a clutch member, said members being constructed to interlock by a partial turn of one clutch member.

4. The combination of a music-roll provided with a clutch member and a detachable head provided with a clutch member, said members being constructed to interlock by a partial turn of one clutch member, and said head being also provided with a driving clutch member.

5. The combination with a tubular body portion of interior clutch members carried by said body portion and removable flanged heads having shanks fitting into the ends of said tubular body portion and each having a clutch member for engaging said interior clutch members.

6. The combination with a tubular body portion of interior clutch members carried by said body portion, removable flanged heads having shank portions fitting into the end of said tube and each having a slot adapted to engage said clutch member.

7. A roll comprising a tubular body portion provided with interior clutch members, and removable flanged heads each having a shank provided with a clutch-surface adapted to engage the clutch-surface of the interior clutch member.

8. A music-roll comprising a tubular body having interior clutch members, each forming a tenon, and detachable flanged heads, each having a shank provided with a slot for engaging one of said tenons.

9. A music-roll comprising a tubular body having an interior engaging member, and a removable flanged head having an exterior clutch member by which it may be rotated and a shank adapted to enter said tubular body and provided with means for engaging said interior member.

10. A music-roll comprising a tubular body, and a removable flanged head having an exterior clutch member by which it may be rotated and a shank adapted to enter said body, said tubular body and said shank being provided with coöperating engaging members whereby the rotation of said head is communicated to said body.

11. A music-roll comprising a tubular body, a removable flanged head having an exterior clutch member by which it may be rotated and a shank adapted to enter said body, said tubular body and said shank being provided one with a recess, the other with a portion adapted to engage in said recess, whereby the rotation of said head is communicated to said body.

In testimony whereof I have signed this specification in the presence of two subscribing witnesses.

WILLARD S. PAIN.

Witnesses:
   WILBUR H. SQUIRE,
   ROBERT A. SQUIRE.